C. S. SNEAD.
Grain Drier.

No. 7,690.

Patented Oct. 1, 1850.

UNITED STATES PATENT OFFICE.

CHAS. S. SNEAD, OF LOUISVILLE, KENTUCKY.

GRAIN-DRIER.

Specification of Letters Patent No. 7,690, dated October 1, 1850.

*To all whom it may concern:*

Be it known that I, CHARLES S. SNEAD, of Louisville, in the county of Jefferson and State of Kentucky, have invented a new and Improved Apparatus for Drying Meal, Grain, &c.; and I do hereby declare that the following is a full, clear, and exact description of the same, reference being had to the accompanying drawings, forming part of this specification, in which—

Figure 1:
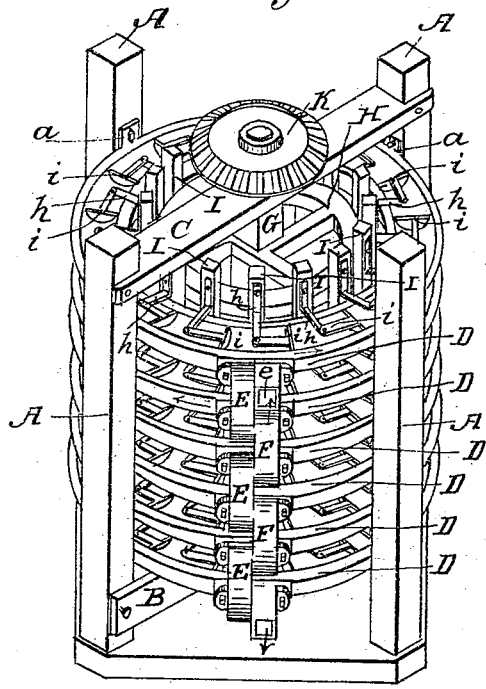
Figure 2:
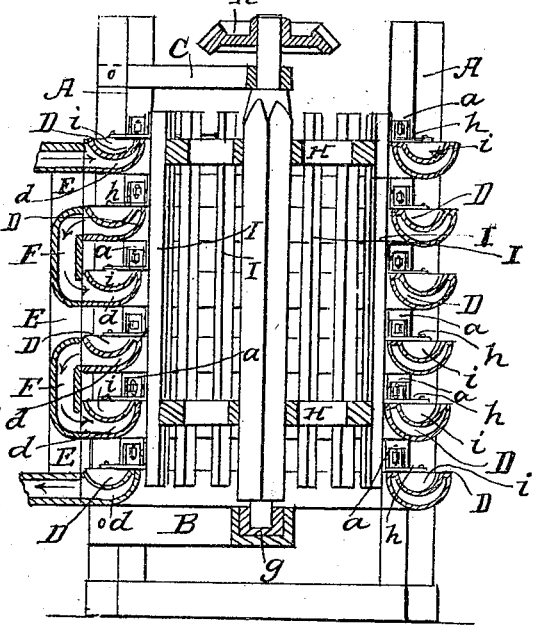
Figure 3:
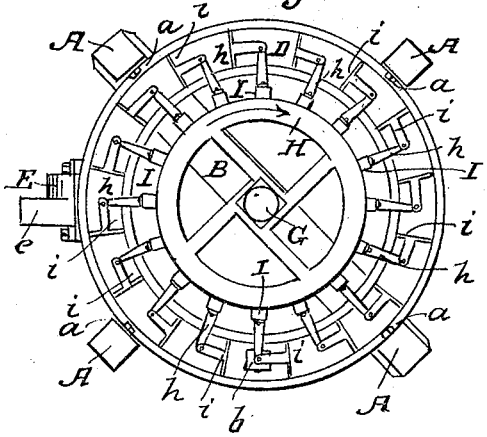
Figure 4:
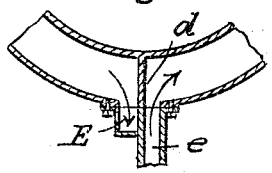
Figure 5:

Figure 1, is an isometrical view. Fig. 2, is a vertical section through the center from the front to back of Fig. 1. Fig. 3, is a plan view as seen from above having the driving wheel and upper guide of the shaft removed. Fig. 4, is a detached view representing part of a horizontal section of one of the troughs taken through the steam space. Fig. 5, is a detached view representing a vertical section taken across the trough through one of the apertures through which the meal or grain falls.

Similar letters of reference indicate corresponding parts in each of the several figures.

The nature of my invention consists of a series of annular troughs, arranged one above another, the bottoms of the troughs are of concave form and double, having a steam space between the inner, and outer casing; the steam spaces around the troughs are connected with each other by pipes or passages, so that steam admitted by a pipe into one steam space, will pass around all the troughs in succession; a vertical drum or barrel is made to rotate within the center of the annular troughs; this drum carries a number of scrapers fitting in the troughs.

The meal or grain is fed into the troughs by a hopper or other convenient arrangement and being kept in motion by the scrapers is passed on through the heated troughs, falling through proper apertures from each trough, to the trough below it, by which the moisture is entirely evaporated from it, and it may be kept perfectly sweet for a very long time in any climate.

To enable others skilled in the art to make and use my invention I will proceed to describe its construction and operation.

The frame of the apparatus consists of four or any convenient number of vertical posts A, A, and cross timbers or bars B and C.

D, D, are annular, or ring shaped cast iron troughs, having their bottoms of concave form, and double; the space between the double bottom extends all around except that it is closed by a partition $d$; in front, the troughs are provided with ears $a$, $a$, which are let into recesses cut in the posts A, A. They are secured by bolts passing through slots in the ears $a$, $a$; each trough is provided with an aperture $b$, each aperture is so arranged that it is immediately in front of that in the trough below.

E, F, are a double set of pipes or passages bolted to the troughs connecting the steam spaces in the bottoms of the troughs. They are arranged alternately on each side of the partitions $d$, those E, being on one side, and those F, being on the other side of the said partitions.

$e$, is the pipe through which the steam enters; $f$ is the pipe through which it passes out.

G is a vertical shaft having its lower end resting in a step bearing $g$, which is supported in the cross bar or timber B; it is kept in a vertical position by a guide in the bar C. H, H, are wheels firmly secured on the shaft G. I, I, are bars bolted to the wheels H H, forming a drum or barrel.

$h$, $h$, are light cast, or wrought iron arms bolted to the bars I, I. $i$, $i$, are scrapers of sheet iron of nearly semi-circular form fitting to the troughs D, D; they have shanks bent over to a position nearly at right angles to the blades and are jointed by pins passing through the ends of the shanks to the ends of the arms $h$, in which the pins are riveted; the shanks of the scrapers fit easily on the pins so as to allow of a little lateral or upward motion of the scraper.

K, is a bevel toothed wheel fast on the upper end of the shaft G. It receives rotary motion from a horizontal shaft.

The operation is as follows: Steam being admitted at the pipe $e$, will take the direction of the arrows shown in Figs. 1, 2, and 4, and turning to the right hand will pass round the steam space in the bottom of the upper trough D, and out into the upper tube or passage E, down which it travels and enters the space under the second trough D, turning to the left, it passes round the trough into the passage F, and so on under all the troughs turning alternately to the right and left, it, together with the water which may have condensed passes out by the pipe $f$, the exhaust steam from a steam engine may be profitably used. The meal or grain to be dried is to be fed into the upper trough by a hopper or by other convenient means. Rotary motion being given to the shaft G, the scrapers will be caused to move round the trough keeping the meal, or grain in constant motion, until it arrives at the aperture b, through which it falls into the next trough below, round which, and round all the troughs in succession it is carried by the scrapers in a similar manner until it passes out through the lower one, where it is received and carried off by any convenient means. The meal or grain being kept in constant motion by the scrapers so as to change the position of every particle and being all in contact with the heating surface, the moisture will be entirely evaporated from it and leave it perfectly dry and as well preserved as to keep well for a long sea voyage notwithstanding the unfavorableness of the climate.

Flour dried by this process has been found perfectly sweet after having been kept two years. Malt or any kind of grain may be dried equally well. Any number of troughs may be used as may be found convenient and any number of scrapers may be used in each trough.

What I claim as new in my invention and desire to secure by Letters Patent is—

The revolving barrel, consisting of the wheels H, H, and the bars I, I, provided with arms $h\ h$ carrying scrapers $i, i$, in combination with the troughs D, D, arranged one above another in the manner, substantially as herein set forth for the purpose of drying meal, grain, &c.

C. S. SNEAD.

Witnesses:
S. H. WALES,
O. D. MUNN.